United States Patent
Trinh

(10) Patent No.: US 10,399,414 B2
(45) Date of Patent: Sep. 3, 2019

(54) METHOD FOR OPERATING A DAZZLE PROTECTION SYSTEM FOR A VEHICLE

(71) Applicant: Robert Bosch GmbH, Stuttgart (DE)

(72) Inventor: Hoang Trinh, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 542 days.

(21) Appl. No.: 15/038,115

(22) PCT Filed: Oct. 7, 2014

(86) PCT No.: PCT/EP2014/071441
§ 371 (c)(1),
(2) Date: May 20, 2016

(87) PCT Pub. No.: WO2015/074797
PCT Pub. Date: May 28, 2015

(65) Prior Publication Data
US 2016/0288627 A1    Oct. 6, 2016

(30) Foreign Application Priority Data
Nov. 25, 2013   (DE) ........................ 10 2013 223 991

(51) Int. Cl.
*B60J 3/02*   (2006.01)
*B60J 3/04*   (2006.01)

(52) U.S. Cl.
CPC .............. *B60J 3/0291* (2013.01); *B60J 3/02* (2013.01); *B60J 3/04* (2013.01)

(58) Field of Classification Search
CPC .............. B60J 3/0291; B60J 3/02; B60J 3/04
USPC ............ 701/36; 348/208.2, 214 D; 296/97.2
See application file for complete search history.

(56) References Cited

U.S. PATENT DOCUMENTS

| | | | |
|---|---|---|---|
| 9,108,492 B2 | 8/2015 | Kim et al. | |
| 2007/0126255 A1* | 6/2007 | Mitsui | B60J 3/0204 296/97.2 |
| 2010/0165099 A1* | 7/2010 | Marchthaler | B60J 3/0204 348/135 |
| 2011/0233384 A1* | 9/2011 | Wu | B60J 3/04 250/208.2 |
| 2012/0019891 A1* | 1/2012 | Dewell | G02F 1/163 359/275 |
| 2013/0146234 A1 | 6/2013 | Kim et al. | |
| 2014/0320946 A1* | 10/2014 | Tomkins | B60J 3/04 359/275 |

FOREIGN PATENT DOCUMENTS

| | | | |
|---|---|---|---|
| DE | 10 2005 007 427 A1 | 8/2006 | |
| DE | 102005007427 A1 * | 8/2006 | B60J 3/04 |
| DE | 102012008736 A1 | 11/2013 | |

(Continued)

OTHER PUBLICATIONS

International Search Report dated Nov. 12, 2014 of the corresponding International Application PCT/EP2014/071441 filed Oct. 7, 2014.

*Primary Examiner* — Marthe Y Marc-Coleman
(74) *Attorney, Agent, or Firm* — Norton Rose Fulbright US LLP; Gerard Messina

(57) ABSTRACT

In a method for operating a dazzle protection system for a vehicle, an image of the head of a vehicle occupant is acquired via a video sensing device and is compared with a reaction pattern typical of dazzling.

20 Claims, 2 Drawing Sheets

(56) References Cited

FOREIGN PATENT DOCUMENTS

| | | |
|---|---|---|
| EP | 1683 668 A2 | 7/2006 |
| JP | 2000108660 A | 4/2000 |
| JP | 2002331835 A | 11/2002 |
| JP | 2003-260933 A | 9/2003 |
| JP | 2005178484 A | 7/2005 |
| JP | 2006137209 A | 6/2006 |
| JP | 2008-189253 A | 8/2008 |
| JP | 2009292474 A | 12/2009 |
| WO | WO 2005/014319 A1 | 2/2005 |

* cited by examiner

METHOD FOR OPERATING A DAZZLE PROTECTION SYSTEM FOR A VEHICLE

FIELD

The present invention relates to a method for operating a dazzle protection system for a vehicle.

BACKGROUND INFORMATION

PCT Application WO 2005/014319 A1 describes a dazzle protection system for a vehicle, which has a dimming apparatus for darkening the vehicle interior as a function of external light influences. The dazzle protection system encompasses an image-producing sensor in the vehicle interior, with which the head posture and eye position of a vehicle occupant can be sensed. The light intensity on the face of the vehicle occupant is ascertained from the acquired image, so that the use of photocells to measure brightness can be dispensed with. As a function of the light intensity and the irradiation direction, control is applied to electrochromic glass in the vehicle windows in order to darken the vehicle interior.

SUMMARY

An object of the present invention is to improve dazzle protection in vehicles.

The dazzle protection system can be used in vehicles in order to implement dazzle protection for the driver or for a further vehicle occupant. In accordance with the present invention, the dazzle protection system encompasses for this purpose a video sensing device that is directed at the head of a vehicle occupant, an evaluation device for evaluating the received signals, and at least one dimming apparatus with which the vehicle interior can be at least partly darkened. These devices or apparatuses are generally sufficient to protect the driver or a further vehicle occupant from dazzling caused by light incident from outside into the vehicle interior. The video sensing device directed at the head of a vehicle occupant generates an optical signal of the head or at least of a part of the head, which signal is analyzed in the evaluation device, whereupon an actuating signal or control signal is generated in the evaluation device for application of control to the dimming apparatus. Control is applied to the dimming apparatus in such a way that dazzling of the vehicle occupants is avoided or at least reduced.

In the method for operating the dazzle protection system, the head or a part of the head of a vehicle occupant is imaged via the video sensing device, and the acquired image is compared with a reaction pattern typical of dazzling. These are natural, spontaneous physical reactions to a high light intensity, which exist as a typical reaction pattern regardless of the person affected. The reaction patterns can be stored in a database, and serve for correlation with the currently acquired images of the video sensing device. If the comparison indicates that the currently acquired image of the head or head part completely or at least largely matches the reaction pattern typical of dazzling, then dazzling of the vehicle occupants exists, whereupon countermeasures can be taken; in particular, the dimming apparatus is actuated for at least partial darkening of the vehicle interior.

The reaction of the vehicle occupant allows the light intensity to be inferred. Additionally or alternatively, the dazzle direction can be inferred from the orientation of the video sensing device in the vehicle interior, so that in addition or alternatively to the light intensity, information also exists regarding the direction of the light incident into the vehicle interior. It is accordingly possible to undertake targeted dimming actions by actuating the dimming apparatus and, for example, to darken only those vehicle windows through which the elevated light incidence into the vehicle from outside is occurring. The result is that the vehicle interior is darkened only to the extent necessary in order to minimize dazzling. Those vehicle windows through which an elevated light incidence is not occurring, conversely, do not need to be darkened by way of the dimming apparatus.

It is generally sufficient to identify the dazzle intensity, and take corresponding dimming actions, only from the reaction of the head or of a head part. It can also be advantageous, however, additionally to measure the brightness in the vehicle interior and/or in the surroundings of the vehicle, in particular via brightness sensors, so that additional information is available regarding the brightness currently existing in the vehicle interior. If applicable, the direction of the light incidence can also be determined in addition to the light intensity. The measured brightness is taken into account in addition to the information from the video sensing device, and can optionally be utilized for a more precise determination of the light intensity and dazzle direction.

It is furthermore possible to use a surroundings camera with which, in particular, the frontal region of the vehicle having oncoming third-party vehicles can be sensed. The headlight light of oncoming vehicles can be sensed by way of the surroundings camera in terms of intensity and angle of incidence, representing additional information with regard to dazzling of the driver, whereupon corresponding countermeasures can be taken by activating the dimming apparatus.

For example, the head position or posture, eye positions, eyelid motion or opening, and pupil size of a vehicle occupant can be sensed by way of the video sensing device in the vehicle which is a constituent of the dazzle protection system. A further body part, preferably an arm and/or a hand of a vehicle occupant, can optionally also be additionally imaged via the video sensing device and compared with an associated reaction pattern. Both in the case of the head or a head part such as the eyes or eyelids, and in the context of an arm or hand of the vehicle occupant, typical defense reactions occur in the case of dazzling, for example averting the head or eyes, quick partial closing of the eyelids with a narrowing of the eyelid opening resulting therefrom, blinking, a sudden reduction in pupil size, or raising the arm or hand in order to shield the eyes. Such a reaction can be compared with a stored reaction pattern, and in the event of a sufficient match a countermeasure can be carried out by activating the darkening apparatus.

Actively controllable apparatuses for darkening or shielding the vehicle interior or a part of the vehicle interior are appropriate, for example, as a dimming apparatus. According to an advantageous embodiment the dimming apparatus is embodied as an electrochromic vehicle window or a vehicle window equipped with suspended particle devices (SPDs), polymer-dispersed liquid crystals, or micro-blinds, in which the light incidence can be adjusted by application of a voltage. Advantageously, at least the windshield is embodied electrochromically or in a further manner recited above, if applicable, additionally or alternatively, one or more of the further windows or all the vehicle windows. It is furthermore possible to embody the mirror glass in the inside and/or outside rearview mirror electrochromically so that dazzling due to a reflected light beam can be actively counteracted.

Also possible are dimming apparatuses that are not integrated into a vehicle window but instead are embodied separately from the vehicle windows, for example a roller blind in front of the windows, such that the opening angle of the slats of the blind can be adjusted via signals of the evaluation device.

In the case of actively controllable dimming apparatuses, in particular with electrochromic vehicle windows, these are advantageously subdivided into individual segments to which control can be applied, so that the entire vehicle window does not necessarily need to exhibit the same degree of darkening but instead different segments of the window can be darkened with different intensities. This makes it possible to darken in targeted fashion only those parts of a vehicle window through which the light dazzling the vehicle occupant is incident.

Multiple video sensing devices can optionally be provided in the vehicle so that a vehicle occupant can be imaged from different angles of view and/or multiple vehicle occupants can be imaged simultaneously. Advantageously, at least the head region of the driver is imaged via the at least one video sensing device. Optionally, the head region of a further vehicle occupant or of the driver, and also of at least one further vehicle occupant, can also be imaged.

It is optionally also possible to infer dazzling from a comparison of the local brightness distribution or from the contrast of the face region with respect to the eye region. A division of the image regions, for example of the face region and eye region, into smaller cells is possible so that a brightness indication or the contrast can be calculated. A global average brightness value, or an average brightness value from specific defined or randomly stipulated image regions that are located outside the image region of the face, can be used to detect unintentional dazzling. The average brightness value or contrast value can be used for plausibilization.

Further advantages and useful embodiments may be understood from the description below and the Figures.

DETAILED DESCRIPTION OF THE DRAWINGS

Figure 1:
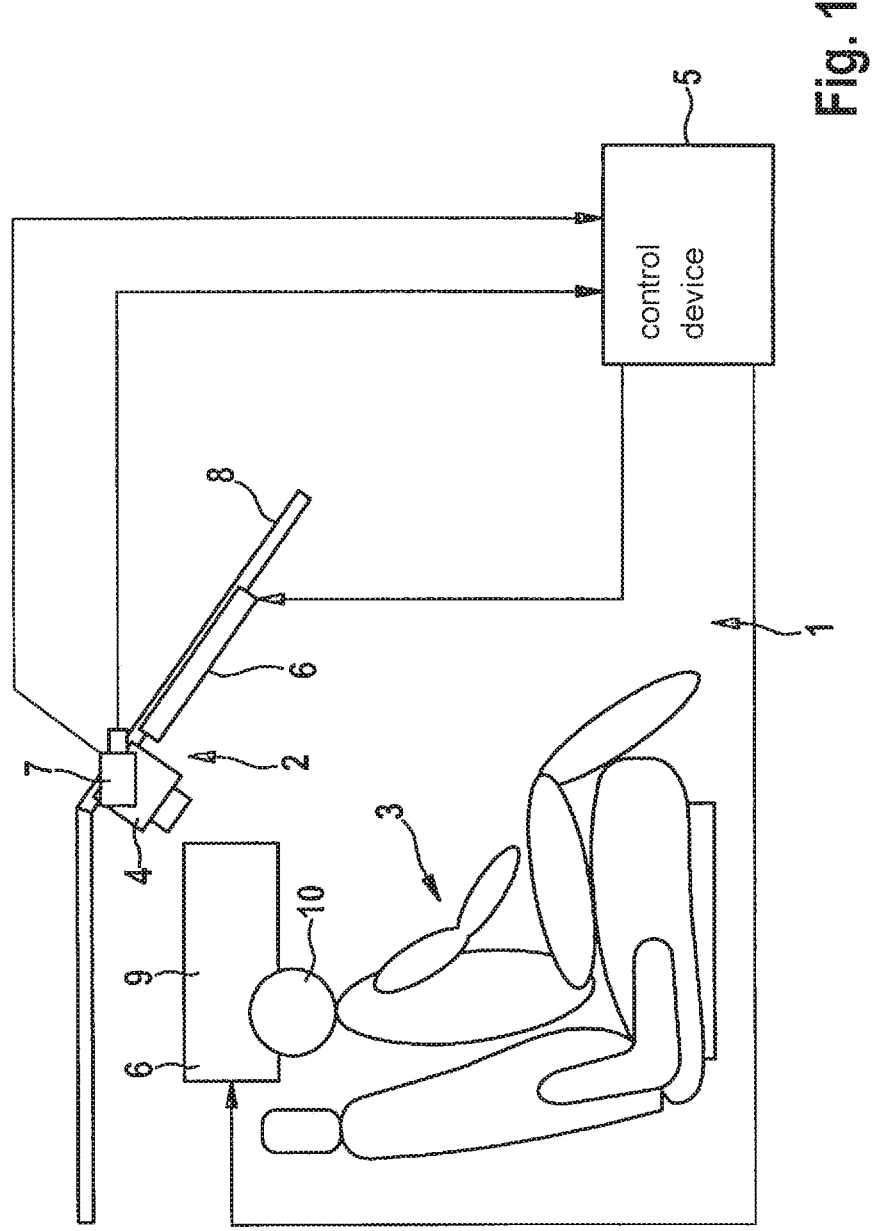
FIG. 1 schematically depicts a vehicle interior having a dazzle protection system that encompasses a video sensing device directed at the driver's head, an evaluation device, and a dimming apparatus.

FIG. 1 schematically depicts vehicle interior 1 of a motor vehicle; a dazzle protection system 2, with which dazzling of a vehicle occupant 3 by an intense light incidence from outside is intended be avoided or at least reduced, is integrated into the vehicle. Vehicle occupant 3 is in particular the driver, but further vehicle occupants or passengers in the vehicle can also be protected by dazzle protection system 2 from being dazzled by light incident from outside.

Dazzle protection system 2 includes, for example: one or more interior cameras 4 that collectively constitute a video sensing device; an evaluation device or control device 5; and one or more dimming apparatuses 6 that are integrated into windshield 8 or into one or more side windows 9, into the rear window, or optionally into the glass of inside or outside mirrors. Dazzle protection system 2 can furthermore encompass a surroundings camera 7 that is embodied in the exemplifying embodiment as a front camera and senses the region located in front of the vehicle.

The interior cameras of video sensing device 4 are directed at head 10 of vehicle occupant 3 and acquire an image of the face, including the eye portion and mouth portion. The head position or head posture, and the gaze direction of the eyes, can be ascertained from the image of video sensing device 4. It is also possible to sense the pupil size.

Images of head 10 are continuously acquired via video sensing device 4 and delivered as input signals to evaluation device 5, in which evaluation, and optionally the generation of actuating signals, occurs. In evaluation device 5, the images acquired of head 10 are compared with reaction patterns typical of dazzling, which are respectively associated with a part of head 10 and are typical of a reaction by the vehicle occupant in the event of dazzling. Among the typical reaction patterns are squinting of the eyelids, twitching of the corner of the mouth and the eyebrows, sudden aversion of the gaze, a sudden change in head posture, a sudden decrease in pupil size, etc. A typical defense reaction with the arm or hand can also be taken into account, for example shielding the eye region with a hand.

If it is found in the context of the evaluation in device 5 that the images acquired of head 10 match one or more stored reaction patterns with sufficient accuracy, an actuating signal is generated and is delivered for adjustment of dimming apparatus 6. Dimming apparatus 6 is preferably an electrochromic window or a vehicle window equipped with suspended particle devices (SPDs), polymer-dispersed liquid crystals, or micro-blinds, which can be darkened by application of an electrical voltage. Advantageously, the window is subdivided into individual electrochromic segments to which control can be applied mutually independently, so that it is not necessary to darken the entire window but only portions of the window.

Additional information about the angle of incidence of the light source irradiating from outside can be taken into account via the front camera or surroundings camera 7, so that the segment in the windshield can be highly accurately controlled and activated to darken.

In the exemplifying embodiment according to FIG. 1, dimming apparatus 6 is integrated into the vehicle window because of the embodiment as an electrochromic window. Also possible, however, is an embodiment as a separate component that is nevertheless located in the light incidence region and can be darkened by application of control, for example in the form of a roller blind on the inner side of a vehicle window or as an electrochromic window that is disposed in front of a vehicle window.

Figure 2:
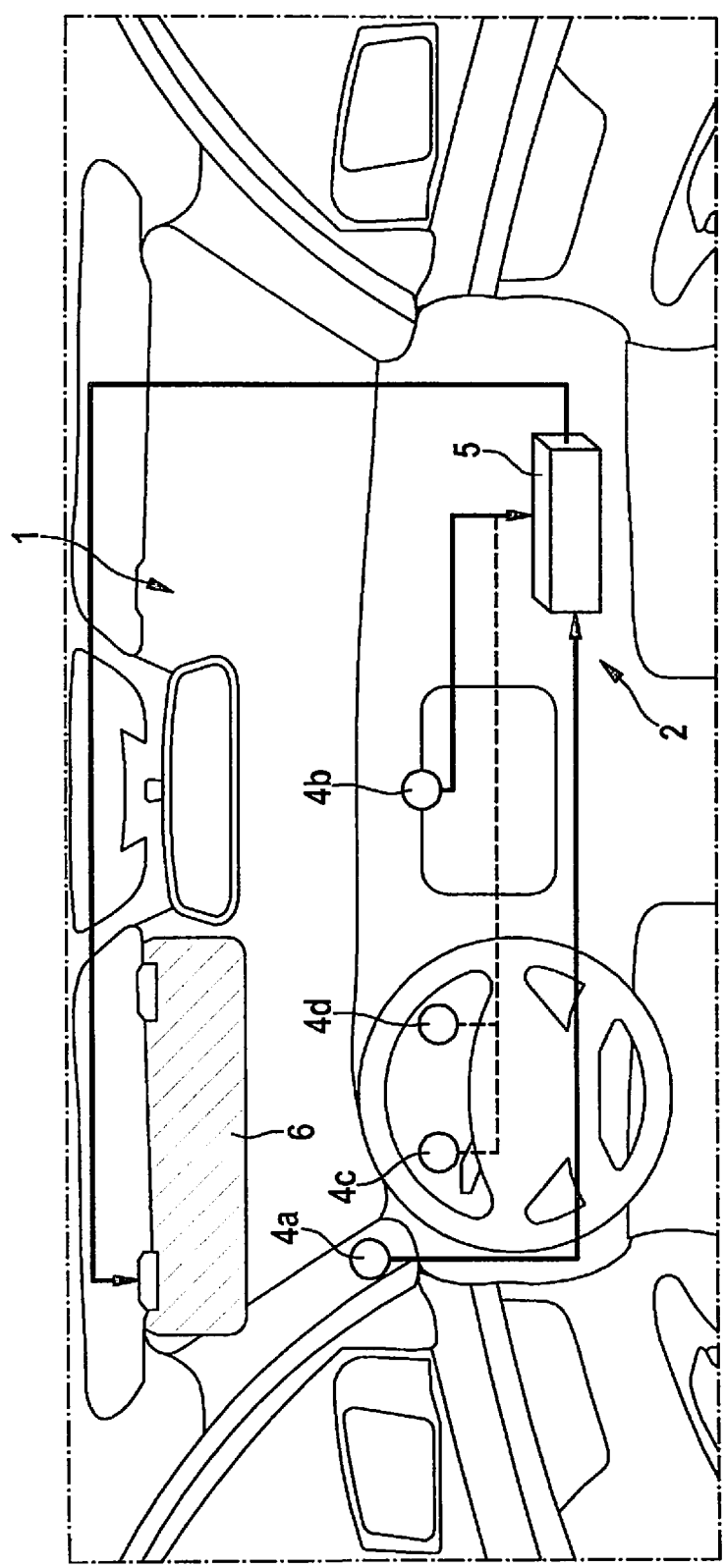
FIG. 2 shows the vehicle interior with various cameras of the video sensing device.

FIG. 2 depicts vehicle interior 1 of a vehicle with various cameras 4a, 4b, 4c, 4d of the video sensing device. The cameras, which are directed at the driver's head, are located, for example, as camera 4a on the A pillar, camera 4b in the center region of the instrument panel, or cameras 4c and 4d on the instrument panel directly below the steering wheel.

In the exemplifying embodiment of dazzle protection system 2 according to FIG. 2, dimming apparatus 6 is embodied separately from the windshield and is implemented as a vision protection panel above the driver's seat, which panel is displaceable between a position directly in contact against the headliner and a swung-down position. The vision protection panel can be embodied as an electrochromic window whose degree of darkening is controllable, by application of an electrical voltage, via actuating signals of evaluation device 5.

What is claimed is:

1. A method for operating a dazzle protection system for a vehicle, the method comprising:
    inferring a dazzle intensity and direction affecting a vehicle occupant from a comparison of an image of a head or a head part acquired via a video sensing device with a reaction pattern typical of dazzling;
    wherein the vehicle has the video sensing device, which is directed at the head of the vehicle occupant, an evaluation device for evaluating received signals, and at least one dimming apparatus to at least partially darken an interior of the vehicle, and
    wherein dazzle intensity and direction is inferred from one of: i) a comparison of the local brightness distribution, or ii) a contrast of a face region with respect to an eye region.

2. The method as recited in claim 1, further comprising:
    sensing the head or the head part of the vehicle occupant via the video sensing device; and
    comparing the sensed head or the head part of the vehicle occupant with an associated reaction pattern.

3. The method as recited in claim 2, wherein the sensing includes sensing a head posture of the vehicle occupant via the video sensing device.

4. The method as recited in claim 2, wherein the sensing includes sensing an eye position of the vehicle occupant via the video sensing device.

5. The method as recited in claim 2, wherein the sensing includes sensing eyelid motion of the vehicle occupant via the video sensing device.

6. The method as recited in claim 2, wherein the sensing includes sensing a pupil size of the vehicle occupant via the video sensing device.

7. The method as recited in claim 2, further comprising:
    sensing an arm or a hand of the vehicle occupant via the video sensing device; and
    comparing the sensed arm or hand with an associated reaction pattern.

8. The method as recited in claim 2, further comprising:
    measuring a brightness in at least one of: an interior of vehicle, and surroundings.

9. The method as recited in claim 2, wherein a position of headlights of an oncoming vehicle is ascertained.

10. The method as recited in claim 2, further comprising:
    at least partially darkening a window of the vehicle based on the inferring.

11. The method as recited in claim 1, wherein the face region and the eye region are divided into smaller cells to determine a brightness indication or the contrast.

12. The method as recited in claim 1, wherein a global average brightness value or an average brightness value from specific defined or randomly stipulated image regions that are located outside the image region of the face is used to detect an unintentional dazzling.

13. A method for operating a dazzle protection system for a vehicle, the method comprising:
    sensing the head or the head part of a vehicle occupant via a video sensing device, wherein the vehicle has the video sensing device, which is directed at the head of the vehicle occupant, an evaluation device for evaluating received signals, and at least one dimming apparatus to at least partially darken an interior of the vehicle; and
    comparing the head or the head part of the vehicle occupant sensed via the video sensing device with an associated reaction pattern;
    inferring a dazzle intensity and direction affecting a vehicle occupant based on the comparison; and
    at least partially darkening an interior of the vehicle via the least one dimming apparatus based on the inferring; and
    wherein the dazzle intensity and direction is inferred from one of: i) a comparison of the local brightness distribution, or ii) a contrast of a face region with respect to an eye region.

14. The method as recited in claim 13, wherein the at least partially darkening includes at least partially darkening a window of the vehicle.

15. The method as recited in claim 13, wherein the face region and the eye region are divided into smaller cells to determine a brightness indication or the contrast.

16. The method as recited in claim 13, wherein a global average brightness value or an average brightness value from specific defined or randomly stipulated image regions that are located outside the image region of the face is used to detect an unintentional dazzling.

17. A dazzle protection system, comprising:
    a video sensing device directed at a head of a vehicle occupant;
    an evaluation device to compare the head or part of the head sensed via the video sensing apparatus with an associated reaction pattern, and to infer a dazzle intensity and direction affecting the vehicle occupant based on the comparison; and
    at least one dimming apparatus to at least partially darken an interior of the vehicle, the evaluation device controlling the at least one dimming apparatus based on an inferred dazzle intensity and direction;
    wherein the dazzle intensity and direction is inferred from one of: i) a comparison of the local brightness distribution, or ii) a contrast of a face region with respect to an eye region.

18. The dazzle protection system as recited in claim 17, wherein the dimming apparatus includes an electrochromic vehicle window having suspended particle devices, polymer-dispersed liquid crystals, or micro-blinds.

19. The dazzle protection system as recited in claim 17, wherein the face region and the eye region are divided into smaller cells to determine a brightness indication or the contrast.

20. The dazzle protection system as recited in claim 17, wherein a global average brightness value or an average brightness value from specific defined or randomly stipulated image regions that are located outside the image region of the face is used to detect an unintentional dazzling.

* * * * *